United States Patent
Mihan et al.

(10) Patent No.: US 6,846,356 B2
(45) Date of Patent: Jan. 25, 2005

(54) PIGMENT CONCENTRATES AND METHOD FOR PRODUCING THEM

(75) Inventors: Shahram Mihan, Ludwigshafen (DE); Andreas Deckers, Flomborn (DE)

(73) Assignee: BASF Aktiengesellschft, Ludwigshafen (DE)

( * ) Notice: Subject to any disclaimer, the term of this patent is extended or adjusted under 35 U.S.C. 154(b) by 48 days.

(21) Appl. No.: 10/311,377

(22) PCT Filed: Jun. 13, 2001

(86) PCT No.: PCT/EP01/06689

§ 371 (c)(1),
(2), (4) Date: Dec. 16, 2002

(87) PCT Pub. No.: WO01/98415

PCT Pub. Date: Dec. 27, 2001

(65) Prior Publication Data

US 2004/0089201 A1 May 13, 2004

(30) Foreign Application Priority Data

Jun. 20, 2000 (DE) .................... 100 29 327

(51) Int. Cl.[7] .................... C08L 91/06; C09C 1/44; C09C 1/36
(52) U.S. Cl. .................. 106/502; 106/272; 106/447; 106/460; 106/471; 106/476; 106/491
(58) Field of Search .................. 106/272, 502, 106/476, 491, 471, 460, 447; 585/10; 502/103; 526/160, 161, 169, 169.1, 169.2, 172

(56) References Cited

U.S. PATENT DOCUMENTS

| | | | |
|---|---|---|---|
| 5,114,990 A | 5/1992 | Dethlefs | 523/200 |
| 5,750,813 A | 5/1998 | Hess et al. | 585/12 |
| 6,080,902 A * | 6/2000 | Herrmann et al. | 585/512 |
| 6,143,846 A * | 11/2000 | Herrmann et al. | 526/170 |
| 6,166,161 A * | 12/2000 | Mullins et al. | 526/346 |
| 6,407,189 B1 * | 6/2002 | Herrmann | 526/160 |
| 6,506,856 B2 * | 1/2003 | Manders et al. | 526/91 |
| 2002/0151639 A1 * | 10/2002 | Knebelkamp et al. | 524/487 |
| 2003/0019400 A1 * | 1/2003 | Deckers et al. | 106/502 |
| 2003/0022978 A1 * | 1/2003 | Hohner et al. | 524/487 |
| 2003/0114603 A1 * | 6/2003 | Mihan et al. | 525/333.8 |
| 2004/0007158 A1 * | 1/2004 | Mihan et al. | 106/271 |
| 2004/0035321 A1 * | 2/2004 | Mihan et al. | 106/31.29 |

FOREIGN PATENT DOCUMENTS

| | | | |
|---|---|---|---|
| DE | 2608600 | * | 9/1976 |
| DE | 100 09 114 | | 8/2001 |
| EP | 0 328 753 | | 8/1989 |
| EP | 0 602 509 | | 6/1994 |
| EP | 0 890 584 | | 1/1999 |
| JP | 11106573 | | 9/1997 |
| JP | 10324782 | | 12/1998 |
| WO | WO 00/58319 | | 10/2000 |
| WO | WO 01/62806 | | 8/2001 |
| WO | WO 01/98377 | * | 12/2001 |
| WO | WO 01/98379 | * | 12/2001 |
| WO | WO 01/98416 | * | 12/2001 |

OTHER PUBLICATIONS

Liang et al. "Constrained Geometry Chromium Catalysts of Olefin Polymerization" Oganometallics vol. 15, pp. 5284–5286, Sep. 1996.

* cited by examiner

*Primary Examiner*—Helene Klemanski
(74) *Attorney, Agent, or Firm*—Keil & Weinkauf

(57) ABSTRACT

Pigment concentrates comprising at least one pigment and one polyolefin wax prepared from one or more olefins by catalysis with a single-site catalyst comprising a transition metal of groups 5 to 8 of the Periodic Table, where the complex contains not more than one cyclopentadienyl system per transition metal atom, the concentrates comprising a thermoplastic, if desired, and additives, if desired.

11 Claims, No Drawings

PIGMENT CONCENTRATES AND METHOD FOR PRODUCING THEM

The present invention relates to pigment concentrates comprising

A) at least one pigment,

B) a polyolefin wax prepared from one or more olefins by catalysis with a single-site catalyst based on a complex of a transition metal of groups 5 to 8 of the Periodic Table, where the complex contains not more than one cyclopentadienyl system per transition metal atom, C) if desired, a thermoplastic, and D) if desired, additives.

Numerous pigments are marketed as pigment concentrate, since this gives easier processing when plastics are being pigmented. These formulations generally comprise, besides the pigment, a dispersant, such as a wax, and also, if desired, a thermoplastic, mostly a polyolefin. The thermoplastic is also termed carrier polymer. A function of the wax is to give fine dispersion of the pigment in the formulation, and to stabilize this dispersion of the pigment. Commercially available formulation of a pigment concentrate of this type (masterbatch) comprises 25% by weight of pigment, 10% by weight of wax, and 65% by weight of a polyethylene. The wax used is frequently a polyethylene wax, for example one obtainable by free-radical polymerization or Ziegler-Natta catalysis. The polyethylene wax may, for example, be modified by oxidation to become polar. All of the ratios of the individual components can be varied within certain limits.

A decisive precondition for the usability of a pigment concentration of this type is correct selection of the wax component. Although it is not itself colored, it affects the brilliance of the pigment concentrate. More precise details can be found in the product brochure "Luwax®—Anwendung in Pigmentkonzentraten", relating to polyethylene waxes from BASF AG.

The wax has to give effective wetting of the pigment agglomerates to prevent clumping of the same. The pigment under consideration gives more effective coloring if there is a relatively large number of relatively small pigment agglomerates, rather than a realtively small number of relatively large pigment agglomerates.

One task of the formulation process is therefore to prevent the production of large pigment agglomerates. It is also desirable to separate any previously formed agglomerations of pigment, and to break these down into what are known as primary particles. Finally, the primary particles should remain separate after the formulation process and not reaggregate on cooling.

This places a number of requirements on the wax. One of these requirements relates to the viscosity of the melt. This should be as slow as possible so that the melted wax can penetrate successfully through the cavities within the pigment agglomerates during the formulation process, which usually involves mixing at a temperature above that at which the wax melts. The resultant shear forces give relatively easy breakdown of the agglomerates into the primary particles.

The wax should also have good wetting capability.

The wetting capability of the waxes can be improved by incorporating polar groups into the wax. In principle, there are a number of process steps for introducing polar groups into a wax.

One method is to degrade the wax to some extent, using atmospheric oxygen or peroxide compounds. Examples of peroxide compounds which may be used are hydrogen peroxide ($H_2O_2$) or dialkyl peroxides. The polar groups introduced into the macromolecules by methods involving some extent of degradation comprise hydroxyl groups and carboxyl groups. These polar groups have a nonuniform distribution across the molecule, and the resultant wetting capability of the molecular chains of the waxes is not ideal.

Another method consists in using polar comonomers, such as acrylic acid, methacrylic acid, acrylic esters, methacrylic esters, or vinyl acetate, and these may be hydrolyzed if desired. A disadvantge of this process is that polar comonomers can act as catalyst poisons for Ziegler-Natta catalysts, and the catalysts then lose some activity. Another disadvantage is that the incorporation of the comonomers into the waxes is not uniform. Comonomeres usually become prefrentially incorporated into the short-chain molecules, and this gives the wax undesirably nonuniform properties.

It has now been found that many pigment concentrates lack the brilliance needed for highly specified applications. The use of larger amounts of pigment cannot provide a complete solution for this problem. The pigment price is the decisive factor in the production cost of a pigment concentrate, and a higher proportion of pigment would therefore be economically disadvantageous.

In contrast, for less highly specified applications it can also be desirable to provide an equivalent pigment concentrate in which the amount of expensive pigment is smaller.

Finally, at high pigment concentrations it has been found that there is no further significant increase in the brilliance of masterbatches, this finding being attributable to a decline in the quality of dispersion. Microscopic methods, for example, can detect agglomerates with poor dispersion.

It is also desirable to have waxes which can be used for pigment concentrates and have particularly good dispersibility and particularly good wetting capability. Waxes having a very uniform structure should be well suited to this purpose.

Polymers and copolymers which have a uniform structure can be obtained from olefins by catalysis with single-site catalysts. EP-A 0 602 509 discloses that waxes can be obtained by activating metallocenes with the aid of a cocatalyst and reacting the metallocenes with olefins in the presence of hydrogen. No usage examples are presented.

EP-A 0 890 584 specifically discloses the use, for masterbatches, of metallocene polypropylene waxes having an isotacticity index above 70%. However, a disadvantage with the use of a metallocene is that specific racemic isomers of the metallocene are needed for preparing isotactic polypropylene. The meso isomer produced by the usual syntheses has first to be separated off and then either discarded or else converted into the desired racemate in a further step.

There are also known polyethylene waxes with a broad molecular weight distribution. These can be prepared by catalysis with $Cp_2Cr$ (chromocene) (DE-A 100 09 114.8, published on . . . ). They are suitable for applications in masterbatches, but brilliance is not always sufficient, in particular for highly specified applications. Finally, Y. Liang et al., *Organometallics*, 1996, 15, 5284, discloses complexes of the formula A as a catalytically active component for polymerizing ethylene

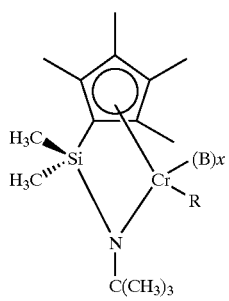

where R is selected from Cl, $CH_3$, $C_6H_5$ and $CH_2Si(CH_3)_3$, B is a Lewis base, e.g. tetrahydrofuran, and x is 0 or 1. However, their activity is too low to be of interest in industry. In addition, the molecular weight of the polymers obtained is too low, and the polymers cannot be used as waxes for producing masterbatches.

It is an object of the present invention, therefore, to provide pigment concentrates which can pigment plastic moldings or plastic sheets whose brilliance is improved over the prior art, without having to increase the percentage of pigment, to provide a process for preparing these concentrates, to produce plastic moldings or plastic sheets pigmented with the pigment concentrates of the invention, and to find a process for pigmenting thermoplastics or moldings, using the concentrates of the invention.

We have found that this object is achieved by means of the pigment concentrates defined at the outset, comprising waxes which have markedly better capability than conventional polyolefin waxes for use as dispersing agents in pigment concentrates.

The pigment concentrates (masterbatches) here comprise the following components:

A) at least one pigment selected from among inorganic and organic pigments.

EXAMPLES OF INORGANIC PIGMENTS ARE zinc white, zinc sulfide, lithopones, white lead, lead sulfate, chalk, titanium dioxide;

iron oxide yellow, cadmium yellow, nickel-titanium yellow, chromium-titanium yellow, chrome yellow, lead chromate, bismuth vanadate, Naples yellow and zinc yellow ultramarine blue, cobalt blue, manganese blue, iron blue ultramarine green, cobalt green, chromium oxide (chromium oxide green);

ultramarine violet, cobalt violet, manganese violet;

ultramarine red, molybdate red, chrome red, cadmium red;

iron oxide brown, chromium-iron brown, zinc-iron brown, manganese-titanium brown;

iron oxide black, iron-manganese black, spinell black, carbon black;

orange-colored spinells and aluminas, cadmium orange, chrome orange, lead molybdate;

aluminum or Cu/Zn alloy.

EXAMPLES OF ORGANIC PIGMENTS ARE metal phthalocyanines, such as phthalocyanine blue and phthalocyanine green, and also perylene red, diaryl yellow, isoindoline yellow, quinophthalone pigments, quinacridone pigments, benzimidazolone pigments, malachite green, thioindigo, monoazo pigments, disazo pigments, laked azo pigment, naphthol AS pigments, benzimidazolone pigments, diketopyrrolopyrrols, indanthrone, azocondensation pigments, disazo condensation pigments, anthraquinone pigments, pyrazolones perinones, aminoketone pigments, indigo and triphenylmethane pigments.

Examples of overviews of commonly used inorganic or organic pigments are found in K. Leissler and G. Rösch, *Kunststoffe* 1996, 86, 965, and also in *Ullmann's Enyclopädie der technischen Chemie*, 4th edition, Headings: Pigments: Introduction; Vol. 18, pp. 547 et seq., Organische Pigmente, Vol. 18, pp. 661 et seq.; Thieme Verlag Stuttgart, 1977. Concentrates with one pigment may be prepared, as may blends having two, three or more different pigments.

B) Polyolefin wax, this polyolefin wax being a waxy molding composition made from at least one polyolefin. Polyolefins used are: polyethylene, polypropylene, poly-1-butene, and also copolymers of ethylene with from 0 to 20 mol % of propene, 1-butene, 1-pentene, 1-hexene, 1-octene, 1-decene, or 1-undecene. Preference is given to a polyethylene wax having from 0 to 10 mol % of propene, 1-butene, 1-pentene, or 1-hexene. The average molar masses $M_w$ of these polyolefin waxes are from 500 to 20 000 g, preferably from 2 000 to 10 000 g, and particularly preferably from 3 000 to 8 000 g. The Q values are in the range from 1.5 to 5, preferably from 1.8 to 3.5, and particularly preferably from 2 to 3. The melting points of these waxes are from 80 to 165° C., preferably from 100 to 140° C., and particularly preferably from 105 to 120° C.

C) If desired, a thermoplastic as carrier polymer, examples of this plastic being polyethylene, polypropylene, polystyrene, polyoxymethylene, polystyrene copolymers, such as styrene-butadiene copolymers, or acrylonitrile-butadiene-styrene terpolymers, or polyvinyl chloride, or else copolymers of ethylene with from 0.1 to 20 mol % of 1-butene, 1-pentene, 4-methyl-1-pentene, 1-hexene, 1-octene, 1-decene, or 1-undecene.

D) If desired, from 0 to 10% by weight of additives, based on the total weight of the pigment concentrate, for example antioxidants; preference is given to antioxidants such as sterically hindered phenols or sterically hindered amines "HALS"; very particular preference is given to sterically hindered phenols of the Ciba Irganox® products.

The quantitative proportions of the various components may be varied within wide limits. The quantitative proportions here are balanced to give a total of 100% by weight.

The minimum amount used of the pigment(s) is 1% by weight, preferably 5% by weight, and particularly preferably 10% by weight. Smaller amounts generally give inadequate color strength. 60% by weight is the upper limit which should be given, and 45% by weight is preferred, since the pigments are the most expensive constituent of the pigment concentrates.

In pigment concentrations comprising carrier polymer, at least 1% by weight of wax is used, and preference is given to at least 2% by weight, since the wetting of pigment and of carrier polymer is not reliably adequate at lower proportions by weight. The maximum % by weight of wax used in pigment concentrations which comprise a carrier polymer is preferably 30, particularly preferably 20, since excessive amounts of wax in the final product can impair the mechanical properties of the sheet or plastic molding to be pigmented. An upper limit of 90% by weight is useful in pigment concentrations of this type which are to be prepared without using the carrier polymer. The minimum proportion of wax in a pigment concentrate free from carrier polymer should be given as 40% by weight, since otherwise the concentrate becomes too expensive.

The addition of carrier polymers is optional. In cases where carrier polymer is used, its proportion is at least 30% by weight, since this results in easier subsequent incorporation of the pigment concentrate during production of the plastic moldings or plastic sheets. 80% by weight may be given as a useful upper limit.

Additives are merely optional, and if they are used their amounts are small. A useful lower limit for antioxidants, such as Irganox, is 0.1% by weight, since at lower amounts the protection from oxidation is no longer significant. 0.5% by weight is preferred, and 1% by weight is particularly preferred. 5% by weight may be given as the upper limit, since if this is exceeded there may be noticeable impairment of the processing properties of the pigment by the low-molecular-weight component; 2% by weight is preferred, and 1.5% by weight is particularly preferred. Another class of additives is that of lead salts, such as basic lead sulfate, or lead stearate, or mixtures of the same, each of which are added in proportions of from 0.5 to 2% by weight, preferably from 1.0 to 1.5% by weight.

Waxes which can be-prepared with the aid of these single-site catalysts comprising a transition metal of groups 5 to 8 of the Periodic Table, where not more than one cyclopentadienyl system is present per transition metal atom, are known per se. In the case of the chromium complexes required here, the compounds have the formulae I a to c.

The variables in formula I a

Ia are defined as follows:

M is an element from the group consisting of V, Nb, Ta, Cr, Mo, W, Mn, Fe in oxidation state +3; preferably V, Cr or Mo, and with particular preference Cr;

$X^1$ and $X^2$ are selected from halogen such as fluorine, chlorine, bromine or iodine, chlorine and bromine being particularly preferred; trifluoroacetate, $BF_4-$, $PF_6-$ or $SbF_6-$, $C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl and n-butyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred, $C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy, or $NR^8R^9$, where $R^8$ and $R^9$, independently of one another, are selected from hydrogen, $C_1$–$C_{12}$ alkyl, $C_2$–$C_{12}$ alkenyl and $C_6$–$C_{14}$ aryl, which are able to form a saturated or unsaturated 5- to 10-membered ring; preference is given to the dimethylamino, the diethylamino, the diisopropylamino, the methylphenylamino and the diphenylamino groups. Examples of amino groups containing saturated rings are the N-piperidyl group and the N-pyrrolidinyl group; examples of amino groups containing unsaturated rings are the N-pyrryl group, the N-indolyl group and the N-carbazolyl group.

Preferably, $X^1$ and $X^2$ are identical; with very particular preference, $X^1$ and $X^2$ are chlorine.

$R^1$ to $R^6$, independently of one another, are hydrogen, halogen, such as fluorine, chlorine, bromine or iodine, preferably chlorine and bromine;

$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-Decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, $C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{10}R^{11}R^{12}$, where $R^{10}$ to $R^{12}$, independently of one another, are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{10}R^{11}R^{12}$, where $R^{10}$ to $R^{12}$ are selected, independently of one another, from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-paraxylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above;

$A^1$ is O—$R^{13}$, S—$R^{13}$, sulfur, N($R^{13}$)$_2$, or P($R^{13}$)$_2$, $R^{13}$ being selected from halogen, $C_1$–$C_{12}$-alkyl, $C_3$–$C_{12}$-cycloalkyl, $C_2$–$C_{12}$-alkenyl, substituted or unsubstituted $C_6$–$C_{14}$-aryl groups and $C_1$–$C_{12}$-alkoxy groups, and these groups being defined as under $R^1$ to $R^6$.

In one particular embodiment of the present invention, two adjacent radicals join with one another with involvement of the parent aromatic system to form a 5- to 10-membered ring, for example, $R^3$ and $R^4$ in formula I may together be: —(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH(C$_6$H$_5$)—O—, —O—CH$_2$—CH$_2$—O—, —O—C(CH$_3$)$_2$—O—, —NCH$_3$—CH$_2$—CH$_2$—NCH$_3$—, —NCH$_3$—CH$_2$—NCH$_3$— or —O—Si(CH$_3$)$_2$—O—.

In another embodiment of the present invention, the catalytically active components used comprise compounds of the formula I b

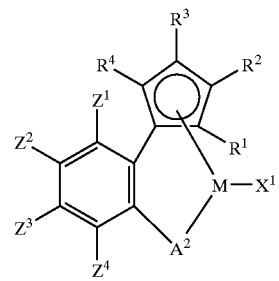

where:
$Z^1$ to $Z^4$, independently of one another, are
hydrogen,
halogen, such as fluorine, chlorine, bromine or iodine, preferably chlorine and bromine;
$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-Decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, $C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{10}R^{11}R^{12}$, where $R^{10}$ to $R^{12}$, independently of one another, are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{10}R^{11}R^{12}$, where $R^{10}$ to $R^{12}$ are selected, independently of one another, from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-paraxylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above;

$A^2$ is selected from oxygen, sulfur, N—$R^{13}$, and P—$R^{13}$, preferably N—$R^{13}$ and P—$R^{13}$, $R^{13}$ being as specified above.

In one particular embodiment of the present invention, two adjacent radicals join with one another with involvement of the parent aromatic system to form a 5- to 10-membered ring, for example, $R^3$ and $R^4$, or $z^1$ and $z^2$, in formula I may together be:

—(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH—(C$_6$H$_5$)—O—, —O—CH$_2$—CH$_2$—O—, —O—C(CH$_3$)$_2$—O——, —NCH$_3$—CH$_2$—CH$_2$—NCH$_3$—, —NCH$_3$—CH$_2$—NCH$_3$— or —O—Si(CH$_3$)$_2$—O—.

In another particular embodiment, $Z^4$ and $A^2$ may join together, with involvement of the parent aromatic system, to form a 5- to 10-membered ring.

In another preferred embodiment, $Z^4$ and $A^2$ form an indole system with involvement of the parent aromatic system.

The remaining variables are as defined in formula I a.

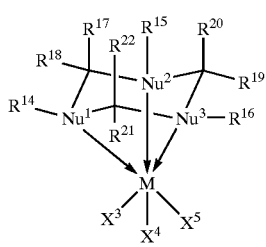

Ic

In formula I c:

$X^3$, $X^4$, and $X^5$, independently of one another, are halogen, such as fluorine, chlorine, bromine, or iodine, particularly preferably chlorine or bromine;

trifluoracetate, $BF_4$—, $PF_6$— or $SbF_6$—, $C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-Decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, and n-butyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl;

$C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy, or $NR^8R^9$, where $R^8$ and $R^9$, independently of one another, are selected from hydrogen, $C_1$–$C_{12}$ alkyl, $C_2$–$C_{12}$ alkenyl and $C_6$–$C_{14}$ aryl, which are able to form a saturated or unsaturated 5- to 10-membered ring; preference is given to the dimethylamino, the diethylamino, the diisopropylamino, the methylphenylamino and the diphenylamino groups. Examples of amino groups containing saturated rings are the N-piperidyl group and the N-pyrrolidinyl group; examples of amino groups containing unsaturated rings are the N-pyrryl group, the N-indolyl group and the N-carbazolyl group.

$X^3$ to $X^5$ are preferably identical, and $X^3$ to $X^5$ are very particularly preferably chlorine.

$Nu^1$ to $Nu^3$, independently of one another, are N or P, and it is preferable for each of $Nu^1$ and $Nu^2$ to be N, and particularly preferable for each of $Nu^1$ to $Nu^3$ to be N.

$R^{14}$ to $R^{16}$, independently of one another, are hydrogen, halogen, such as fluorine, chlorine, bromine or iodine, preferably chlorine and bromine;

$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, $C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{10}R^{11}R^{12}$, where $R^{10}$ to $R^{12}$, independently of one another, are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{10}R^{11}R^{12}$, where $R^{10}$ to $R^{12}$ are selected, independently of one another, from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above;

$R^{14}$ to $R^{16}$ are preferably identical.

$R^{17}$ to $R^{22}$, independently of one another, are hydrogen, halogen, such as fluorine, chlorine, bromine or iodine, preferably chlorine and bromine;

$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{10}R^{11}R^{12}$, where $R^{10}$ to $R^{12}$, independently of one another, are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{10}R^{11}R^{12}$, where $R^{10}$ to $R^{12}$ are selected, independently of one another, from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above.

It is preferable for all of $R^{17}$, $R^{19}$ and $R^{21}$ to be identical, and each of $R^{18}$, $R^{20}$ and $R^{22}$ is preferably hydrogen. It is very particularly preferable for $R^{17}$ to $R^{22}$ to be hydrogen. The triazacyclohexane ligands needed for the synthesis of these very particularly preferred compounds are particularly easy to synthesize.

In one particular embodiment of the formula I c, two adjacent radicals may together form a saturated or unsaturated 4- to 9-membered ring, for example two radicals may together be: $C_3$–$C_9$-alkylidene, for example —(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—; and also cyclic aldols, ketals, or amines, such as —O—CH$_2$—O—, —O—CH(CH$_3$)—O—, —O—CH—(C$_6$H$_5$)—O—, —O—CH$_2$—CH$_2$—O—, —O—C(CH$_3$)$_2$—O—, —N(CH$_3$)—CH$_2$—CH$_2$—N(CH$_3$)—, —N(CH$_3$)—CH$_2$—N(CH$_3$)— or —O—Si(CH$_3$)$_2$—O—, In a further embodiment, the single-site catalyst comprises, as catalytically active component, a triazacyclohexane complex or a triphosphacyclohexane complex of formula Ic.

The other variables are as defined in formula I a.

The preparation of the transition metal complexes of the formula I a to c is known per se. Suitable syntheses for complexes of the formula I a or b are found in DE-A 197 10 615, in A. Döhring et al., *Organometallics* 2000, 19, 388, and in J. C. Weber, Dissertation, MPI Mülheim/Ruhr, Germany 1999.

The preparation of the particularly preferred triazacycloalkane ligands for complexes of the formula Ic is known per se. Those for the synthesis of the very particularly preferred compounds of the formula I c where $R^{17}$ to $R^{22}$ are each hydrogen and the radicals $R^{14}$ to $R^{16}$ are each identical may be synthesized very effectively by mixing formaldehyde in the form, for example, of formalin solution with the associated amine $R^{14}$—NH$_2$. Various synthesis pathways for these complex ligands are described, for example, in F. Weitl et al., *J. Am. Chem. Soc.* 1979, 101 2728; M. Takahashi, S. Takamoto, *Bull. Chem. Soc.* Japan 1977, 50, 3413; T. Arishima et al., *Nippon Kagaku Kaishi* 1973, 1119; L. Christiansen et al. *Inorg. Chem.* 1986, 25, 2813; L. R. Gahan et al., *Aust. J. Chem.* 1982, 35, 1119; B. A. Sayer et al., *Inorg. Chim. Acta*, 1983, 77, L63; K Wieghardt et al., Z. Naturforsch., 1983, 38b, 81 and I. A. Fallis et al., *J. Chem. Soc., Chem. Commun.* 1998, 665.

The metal complexes, especially the chromium complexes, may be obtained in a simple manner by reacting the corresponding metal salts such as metal chlorides or metal carbonyls, for example, with the ligand, as for example in P. Chaudhuri, K. Wieghardt, *Prog. Inorg. Chem.* 1987, 35, 329 or G. P. Stahley et al., *Acta Crystall.* 1995, C51, 18.

In order that above complexes of the formulae I a to c are catalytically active, they are activated with a cation-forming compound. Suitable cation-forming compounds are selected aluminum or boron compounds having electron withdrawing radicals (e.g. trispentafluorophenylborane, trispentafluorophenylaluminum, N,N-dimethylanilinium tetrakispentafluorophenylborate, tri-n-butylammonium tetrakispentafluorophenylborate, N,N-dimethylanilinium tetrakis(3,5-bisperfluoromethyl)phenyl-borate, tri-n-butylammonium tetrakis(3,5-bisperfluoromethyl)-phenylborate, and tritylium tetrakispentafluorophenylborate). These activators for complexes of the formulae I a to c are described in DE-A 199 35 407, in PCT/EP 0002716, and in Angew. Chem. Int. Ed., 1994, Vol. 33, p. 1877. Preference is given to dimethylanilinium tetrakispentafluorophenylborate, tritylium tetrakispentafluorophenylborate, and trispentafluorophenylborane.

If boron compounds or aluminum compounds are used as activators for the complexes of the formula I a to c, the molar ratio in which they are used is generally from 1:10 to 10:1, based on M, preferably from 1:2 to 5:1, particularly preferably from 1:1.5 to 1.5:1.

Another suitable class of cation-forming compounds comprises the aluminoxanes of the formulae II a and b.

The structure of the aluminoxanes is not precisely known. They are products obtained by careful partial hydrolysis of aluminum alkyls (see DE-A 30 07 725). These products do not exist in pure form but are instead mixtures of open-chain and cyclic structures of type II a and b. These mixtures are presumed to exist in a dynamic equilibrium with one another.

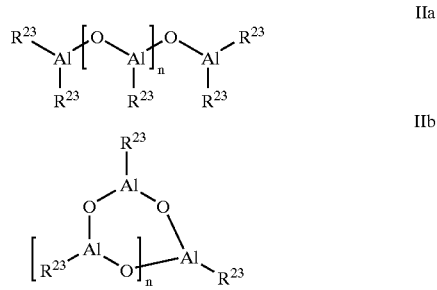

In formulae II a and b, the radicals $R^{23}$, independently of one another, are $C_1$–$C_{12}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl; with particular preference methyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, or $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl; and n is an integer from 0 to 40, preferably from 1 to 25, and with particular preference from 2 to 22.

In the literature, cagelike structures are also discussed for aluminoxanes (Y. Koide, S. G. Bott, A. R. Barron *Organometallics* 1996, 15, 2213–26; A. R. Barron *Macromol. Symp.* 1995, 97, 15–25). Irrespective of the actual structure of the aluminoxanes, they are suitable activators for complexes of transition metals of the formulae I a to c.

Mixtures of different aluminoxanes are particularly preferred activators in those cases where polymerization is conducted in a solution of a paraffin, n-heptane or isododecane, for example. One particularly preferred mixture is the COMAO available commercially from Witco GmbH, having a formula of

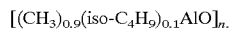

$[(CH_3)_{0.9}(iso\text{-}C_4H_9)_{0.1}AlO]_n.$

To activate the complexes of the formula I a to c with aluminoxanes an excess of aluminoxane, based on M, is generally needed. Useful molar ratios M:Al are in the range from 1:10 to 1:10 000, preferably from 1:50 to 1:1 000, and particularly preferably from 1:100 to 1:500.

The selected complex of the formulae I a to c and the compound forming cations join together to form a catalyst system. The activity of this catalyst system can be further raised by adding one or more further aluminum alkyl compounds of the formula $Al(R^{23})_3$.

The activity of the catalyst system can be increased by adding another aluminum alkyl compound of the formula $Al(R^{23})_3$ or by adding aluminoxanes. Aluminum alkyl compounds of the formula $Al(R^{23})_3$ or aluminoxanes may also act as molecular weight regulators. Another effective molecular weight regulator is hydrogen. The molecular weight can be particularly effectively regulated via the reaction temperature and the residence time.

Modern industrial-scale preparation processes for polyolefin waxes are solution processes, suspension processes, bulk-polymerization processes in liquid or supercritical monomer, and also gas-phase processes, and these latter may involve gas phases with agitation, or gas phases in a fluidized-bed process.

In order that the complexes of the formulae I a to c can be used in suspension processes, bulk-polymerization processes or gas-phase processes, it is advantageous to immobilize them on a solid support, otherwise problems of polymer morphology can occur (agglomeration, wall deposits, blocking of lines or of heat exchangers) and lead to shutdown of the plant.

Catalyst systems made from complexes of the formulae I a to c and activator can readily be deposited on a solid support. Examples of support materials which may be used are porous metal oxides of metals of groups 2–14 or mixtures of the same, and also phyllosilicates, and also solid halides of metals of groups 1, 2 and 13, and polymeers, such as polyethylene or polypropylene. Preferred examples of metal oxides of groups 2–14 are $SiO_2$, $B_2O_3$, $Al_2O_3$, MgO, CaO and ZnO. Preferred phyllosilicates are montmorillonites or bentonites. Preferred halides are $MgCl_2$ or amorphous $AlF_3$.

Particularly preferred support materials are spherical silica gels and aluminosilicate gels of the formula $SiO_2$a $Al_2O_3$, where a is generally a number in the range from 0 to 2, preferably from 0 to 0.5. Silica gels of this type are commercially available, for example Silica Gel 332, Sylopol® 948 or Sylopol 952 or S 2101 from W. R. Grace or ES 70X from Crosfield.

Particle sizes which have proven successful for the support material are average particle diameters of from 1 to 300 μm, preferably from 20 to 80 μm. This particle diameter can be determined by known methods, such as screening methods. The pore volume of these supports is from 1.0 to 3.0 ml/g, preferably from 1.6 to 2.2 ml/g, and particularly preferably from 1.7 to 1.9 ml/g. The BET surface area is from 200 to 750 m²/g, preferably from 250 to 400 m²/g.

In order to remove any contaminants, in particular moisture, adhering to the support material, the support materials may be scalded prior to doping, suitable temperatures for this being from 45 to 1000° C. Temperatures of from 100 to 750° C. are particularly suitable for silica gels and other metal oxides. A range from 50 to 100° C. is preferred for $MgCl_2$ supports. This scalding should take place over a period of from 0.5 to 24 hours, and preferred scalding times are from 1 to 12 hours. The pressure conditions are not critical per se. The scalding may take place at atmospheric pressure. However, reduced pressures of from 0.1 to 500 mbar are advantageous, and the range from 1 to 100 mbar is particularly advantageous, and the range from 2 to 20 mbar is very particularly advantageous. The support material may also receive chemical pretreatment.

To dope the catalyst, the procedure is generally to slurry the support material in a suspension medium and to combine this suspension with the solution of the triazacyclohexane complex and of the activator. The volume of the suspension medium here is from 1 to 20 times the pore volume of the catalyst support. The catalyst may then be isolated from the suspension medium by a suitable method, such as filtering, centrifuging or evaporation.

To improve control of the morphology, the catalyst may be subjected to prepolymerization with small amounts of monomer prior to the actual polymerization. The prepolymerization may be terminated by metering in a reversible catalyst poison, or by stopping the monomer feed, and the catalyst which has been subjected to prepolymerization may then be fed into the polymerization system.

To avoid any electrostatic charging of the polymerization system or of the product, as may be found during polymerizations, an antistat may be added to the reaction mixture. Suitable antistats are dilute solutions of aliphatic alcohols, such as isopropanol, in paraffins, such as n-heptane. Other suitable antistats are available commercially from DuPont as Stadis® grades.

The polyolefin waxes obtained by one of the polymerization processes mentioned, with the aid of a complex of the formula I a to c, may be further processed by various methods to give masterbatches, a common feature of these methods being that wax and carrier polymer, but not the pigment, are melted in the decisive step, and the pigment(s) is/are incorporated, as are additives if desired.

Prior to the actual mixing, the components may, if desired, be premixed, drum mixers or tumbling mixers being particularly suitable for this purpose. Micronization processes may also be carried out if desired.

In the actual mixing a distinction is made between batch processes and continuous processes. For batch processes simple kneaders may be used. Examples of equipment in which continuous processes may be carried out are high-speed mixers, single-screw extruders, twin-screw extruders, Buss kneaders, planetary-gear extruders, open divided trough kneaders, and high-speed stirrer systems.

The pigment concentrates are then pelletized in the usual way. For this purpose use may be made of strand pelletizers, in which the mixture, in the form of an extrudate, is cooled under water and then, either within the waterbath or after leaving the waterbath, is cut to give pellets. Pelletizing dies are another suitable means of cutting (die-face cutting process).

To produce the moldings or sheeting, the procedure is to begin by mixing from 0.01 to 10% by weight, preferably from 0.5 to 5% by weight, particularly preferably from 0.5 to 2.5% by weight, of pigment concentrate with from 90 to 99.99% by weight, preferably from 95 to 99.5% by weight, particularly preferably from 97.5 to 98.5% by weight, of polymer to be pigmented, and also, if desired from 0 to 5% by weight of additives, preferred additives being antioxidants or biocides.

Suitable polymers to be pigmented are: polyethylene, polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides, such as Nylon-6 or Nylon-6,6, polyvinyl chloride, and also copolymers of ethylene with from 0.1 to 20 mol % of 1-butene, 1-pentene, 1-hexene, 4-methyl-1-pentene, 1-octene, 1-decene or 1-undecene. The polymer to be pigmented and the carrier polymer of the masterbatch may be identical here, but do not have to be identical.

For mixing the pigment concentrates with the polymers and also, if desired, with the additives, use may in principle be made of the processes used to prepare the masterbatch itself. For batch processes use may again be made of simple kneaders. Examples of equipment which may be used to carry out continuous processes are high-speed mixers, single-screw extruders, twin-screw extruders, Buss kneaders, planetary-gear extruders, open divided trough kneaders, and high-speed stirrer systems. Preference is given here to continuous processes.

The moldings and sheeting may be produced by injection molding, film extrusion or casting at temperatures above the melting point of the polymer. The processing properties of the moldings and sheeting of the invention are not disadvantageously affected by use of the pigment concentrates of the invention.

The moldings or sheeting obtained by the process of the invention has markedly higher color brilliance than moldings or sheeting availabel commercially. The mechanical properties of the materials are not disadvantageously affected by use of the pigment concentrates of the invention.

EXAMPLE

The fundamentals of preparation of the complex (n-$C_{12}H_{25}NCH_2)_3CrCl_3$ and of polymerization of ethylene are described in DE-A 199 35 407, in PCT/EP 0002716 and, respectively, in Angew. Chem. Int. Edition, 1994, Vol. 33, p. 1877.

5 mg (6.7 μmol) of (n-$C_{12}H_{25}NCH_2)_3CrCl_3$, dissolved in toluene, were activated in a 1 liter steel autoclave (Büchi) using 1.4 ml of 30% strength MAO (methylaluminoxane) from Witco, the Al:Cr ratio being set at 1 000:1. 400 ml of isobutane and 8 1 (0.38 mol) of hydrogen were introduced under pressure, and the autoclave was then heated to 90° C. 40 bar of ethylene were then introduced under pressure and polymerization was carried out for 30 minutes while maintaining the pressure by feeding more ethylene at 40 bar.

The polymerization was terminated by reducing the pressure in the autoclave.

Yield: 46 g, corresponding to an activity of 14 000 kg of PE/(mol of Cr h).

The resultant wax had the following properties: solidification point 128.5° C.; $M_w$: 5 200 g, $M_n$: 2 100 g. $M_w/M_n$= 2.5.

The components used for the pigment concentration of the invention in Example 1 were the following:

30% by weight of Halogen® Blue (commercially available from BASF AG).

15% by weight of polyethylene wax,

55% by weight of polyethylene (Lupolen® 1800 S) in the form of pellets (commercially available from Elenac GmbH).

The following components were used in Example 2, with similar processing:

30% by weight of Halogens® Green (commercially available from BASF AG)

15% by weight of polyethylene wax,

55% by weight of polyethylene (Lupolen® 1800 S) in the form of pellets (commercially available from Elenac GmbH).

The components were premixed in a high-speed stirrer system to the melting point of the wax. During this process the wax wetted the pigment and rendered it dust-free, and contributed to the dispersing of the pigment in the wax phase. This mixture was then passed to a twin-screw extruder. The temperature was increased by a further 10° C. During this operation, the PE pellets were coated with a thin wax layer. After extrusion, the pigment concentrate was cooled carefully, so that there was no separation of the solidified pigment/wax layer.

The comparative products were prepared in a similar way. Commercially available wax samples were used.

To test color intensity, 1 g of each pigment concentrate from the examples given was premixed with 91.5 g of Lupolen 50D and 7.5 g of $TiO_2$ as optical brightener, mixed in a blow-molding machine from 130 to 150° C. and blow-molded to give canisters.

To assess color intensities, a 5×5 cm piece was cut out from the canisters and studied by spectrophotometry (Spectraflash 600 apparatus from Datacolor) in the wavelength region of 400 to 700 nm, to DIN 6176.

The results are seen in Table 1.

TABLE 1

Color strength assessment for Examples 1–2 and comp. 1a/b, and also comp. 2a/b

| Example Number | Polyethylene wax (Preparation process) | Pigment Phthalocyanine | Color strength assessment |
|---|---|---|---|
| 1 | (n-$C_{12}H_{25}NCH_2)_3CrCl_3$ | Heliogen ® Blue K 6911 D | 100% |
| comp. 1a | High pressure[1] | Heliogen Blue K6911 D | 85.3% |
| comp. 1b | Ziegler-Natta[2] | Heliogen Blue K6911 D | 88.2% |
| 2 | (n-$C_{12}H_{25}NCH_2)_3CrCl_3$ | Heliogen Green K8730 | 100% |
| comp. 2a | High pressure | Heliogen Green K8730 | 82.7% |
| comp. 2b | Ziegler-Natta | Heliogen Green K8730 | 89.5% |

[1]Luwax ® A, can be purchased from BASF AG.
[2]Clariant-Wachs PE 520, can be purchased from Clariant AG

We claim:

1. A pigment concentrate comprising

A) at least one pigment,

B) a polyolefin wax prepared from one or more olefins by catalysis with a single-site catalyst based on a complex of formulae Ia to Ic

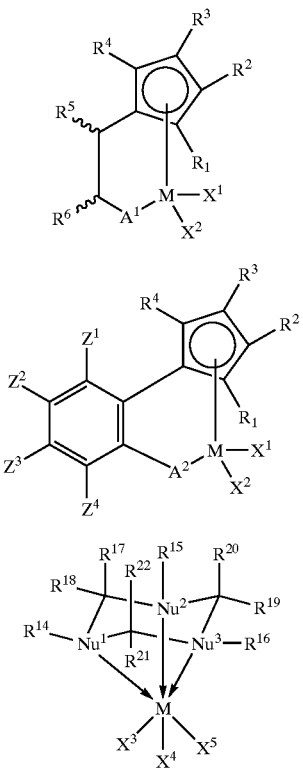

where:
M is an element from the series V, Nb, Ta, Cr, Mo, W, Mn, Fe in the oxidation state +3;
$X^1$ to $X^5$ are independently of one another selected from a group consisting of:
  halogen;
  trifluoracetate;
  $BF_4-$, $PF_6-$ and $SbF_6-$;
  $C_1-C_{18}$ alkyl;
  $C_3-C_{12}$ cycloalkyl;
  $C_7-C_{20}$ aralkyl;
  $C_6-C_{14}$ aryl;
  $C_1-C_{12}$ alkoxy; and
  $NR^8R^9$;
$R^8$ and $R^9$ are independently of one another selected from a group consisting of: hydrogen, $C_1-C_{12}$ alkyl, $C_2-C_{12}$ alkenyl and $C_6-C_{14}$ aryl, or
$R^8$ and $R^9$ together with the nitrogen to which they are bonded form a saturated or unsaturated 5- to 10-membered ring;
$R^1$ to $R^6$, $Z^1$ to $Z^4$, and $R^{14}$ to $R^{16}$ are independently of one another selected from a group consisting of:
  hydrogen;
  halogen;
  $C_1-C_{18}$-alkyl;
  $C_1-C_{12}$-alkyl, mono- or polysubstituted with donor atoms;
  mono- or polyhalogenated $C_1-C_{12}$-alkyl groups;
  $C_2-C_{12}$-alkenyl;
  $C_3-C_{12}$-cycloalkyl;
  $C_7-$ to $C_{20}$-aralkyl;
  $C_6-C_{14}$-aryl;
  silyl $SiR^{10}R^{11}R^{12}$;
  siloxy $OSiR^{10}R^{11}R^{12}$;
  $C_1-C_{12}$-alkoxy; and
  $C_6-C_{14}$-aryl, in turn substituted with one or more $C_1-C_{12}$ alkyl, $C_1-C_{12}$ alkenyl, $C_3-C_{12}$ cycloalkyl, $C_6-C_{14}$ aryl, silyl $SiR^{10}R^{11}R^{12}$, siloxy $OSiR^{10}R^{11}R^{12}$ or $C_1-C_{12}$-alkoxy groups;
and, in formulae Ia and Ib, two adjacent radicals $R^1$ to $R^6$, and $Z^1$ to $Z^4$, together with the ring to which they are bonded, can form a 5- to 10-membered ring;
$R^{17}$ to $R^{22}$ are independently of one another selected from a group consisting of:
  hydrogen;
  $C_1-C_{18}$-alkyl;
  $C_1-C_{12}$-alkyl, mono- or polysubstituted with donor atoms;
  mono- or polyhalogenated $C_1-C_{12}$-alkyl groups;
  $C_2-C_{12}$-alkenyl;
  $C_3-C_{12}$-cycloalkyl;
  $C_7-$ to $C_{20}$-aralkyl;
  $C_6-C_{14}$-aryl;
  silyl $SiR^{10}R^{11}R^{12}$;
  siloxy $OSiR^{10}R^{11}R^{12}$;
  $C_1-C_{12}$-alkoxy; and
  $C_6-C_{14}$-aryl, in turn substituted with one or more $C_1-C_{12}$-alkyl, $C_1-C_{12}$ alkenyl, $C_3-C_{12}$cycloalkyl, $C_6-C_{14}$-aryl, silyl $SiR^{10}R^{11}R^{12}$, siloxy $OSiR^{10}R^{11}R^{12}$ or $C_1-C_{12}$-alkoxy groups;
and, in formula Ic, two adjacent radicals $R^{14}$ to $R^{22}$ can form a saturated or unsaturated 4- to 9-membered ring;
$R^{10}$ to $R^{12}$ are independently of one another hydrogen, $C_1-C_{12}$-alkyl, $C_7-C_{15}$-aralkyl and $C_6-C_{14}$-aryl;
$A^1$ is $O-R^{13}$, $S-R^{13}$, $N-(R^{13})_2$, or $P-(R^{13})_2$;
$A^2$ is oxygen, sulfur, $N-R^{13}$ or $P-R^{13}$; and, in formula Ib, $Z^4$ and $A^2$ together with the phenyl ring to which they are bonded, can form a 5- to 10-membered ring;
$R^{13}$ is halogen, $C_1-C_{12}$-alkyl which is optionally mono- or polysubstituted with donor atoms, mono- or polyhalogenated $C_1-C_{12}$-alkyl, $C_3-C_{12}$-cycloalkyl, $C_1-C_{12}$-alkoxy, or $C_6-C_{14}$-aryl which is optionally substituted with one or more $C_1-C_{12}$-alkyl, $C_1-C_{12}$-alkenyl, $C_3-C_{12}$-cycloalkyl, $C_6-C_{14}$-aryl, silyl $SiR^{10}R^{11}R^{12}$, siloxy $OSiR^{10}R^{11}R^{12}$ or $C_1-C_{12}$-alkoxy groups;
$Nu^1$ to $Nu^3$ in each case are N or P,
C) optionally a thermoplastic carrier polymer, and
D) optionally additives.

2. A pigment concentrate as claimed in claim 1, wherein the single-site catalyst comprises, as catalytically active component, a triazacyclohexane complex or a triphosphacyclohexane complex of formula Ic.

3. A pigment concentrate as claimed in claim 1, wherein M is Cr in formula Ic.

4. A pigment concentrate as claimed in claim 1, comprising at least one pigment, one polyolefin wax, one thermoplastic carrier polymer, and also additives.

5. A pigment concentrate as claimed in claim 1, comprising at least one pigment, one polyolefin wax, and also additives.

6. A process for preparing the pigment concentrate defined in claim 1, which comprises mixing the components at above the melting point of the wax.

7. A process for preparing the pigment concentrate defined in claim 4, wherein the components are mixed at above the melting point of wax and carrier polymer.

8. A plastic molding or plastic sheet, comprising the pigment concentrate defined in claim 1.

9. A process for pigmenting plastic moldings or plastic sheets, which comprises mixing the plastic and the pigment concentrate defined in claim 1 by melt-homogenization.

10. The pigment concentrate defined in claim 1, wherein the polyolefin wax is a polyethylene wax.

11. The pigment concentrate defined in claim 2, wherein the polyolefin wax is a polyethylene wax.

* * * * *

UNITED STATES PATENT AND TRADEMARK OFFICE
CERTIFICATE OF CORRECTION

PATENT NO. : 6,846,356 B2
APPLICATION NO. : 10/311377
DATED : January 25, 2005
INVENTOR(S) : Mihan et al.

It is certified that error appears in the above-identified patent and that said Letters Patent is hereby corrected as shown below:

Claim 1, column 19, in formula Ia "$R_1$" should read --$R^1$--;

Claim 1, column 19, in formula Ib "$R_1$" should read --$R^1$--; and

Claim 1, column 19, line 40, "$BF_4$-, $PF_6$- and $SbF_6$-;" should read --$BF_4^-$, $PF_6^-$ and $SbF_6^-$;--.

Signed and Sealed this

Twenty-second Day of August, 2006

JON W. DUDAS
*Director of the United States Patent and Trademark Office*